Oct. 8, 1968 G. L. ROWE ET AL 3,405,205

METHOD OF UNIFORMLY HEATING AN ANNULAR CARBONACEOUS BODY

Filed Dec. 1, 1965

INVENTORS
GAYLE L. ROWE
JOE R. WILSON
BY
ATTORNEY

United States Patent Office 3,405,205
Patented Oct. 8, 1968

3,405,205
METHOD OF UNIFORMLY HEATING AN ANNULAR CARBONACEOUS BODY
Gayle L. Rowe, Parma Heights, and Joe R. Wilson, North Olmsted, Ohio, assignors to Union Carbide Corporation, a corporation of New York
Filed Dec. 1, 1965, Ser. No. 510,920
3 Claims. (Cl. 264—105)

ABSTRACT OF THE DISCLOSURE

A method for forming a large thick-walled annular carbonaceous body by placing an electrically conductive mandrel within the hollow portion of the annular body and heating the body by activating induction heating means. The mandrel due to its presence in the inductive field, becomes hot at its surface and transfers heat to the inner wall of carbonaceous body thereby effecting a minimization of temperature gradient in the body during heating. The mandrel is cooled at the termination of the heating cycle by passing a coolant therethrough.

---

Figure 1:
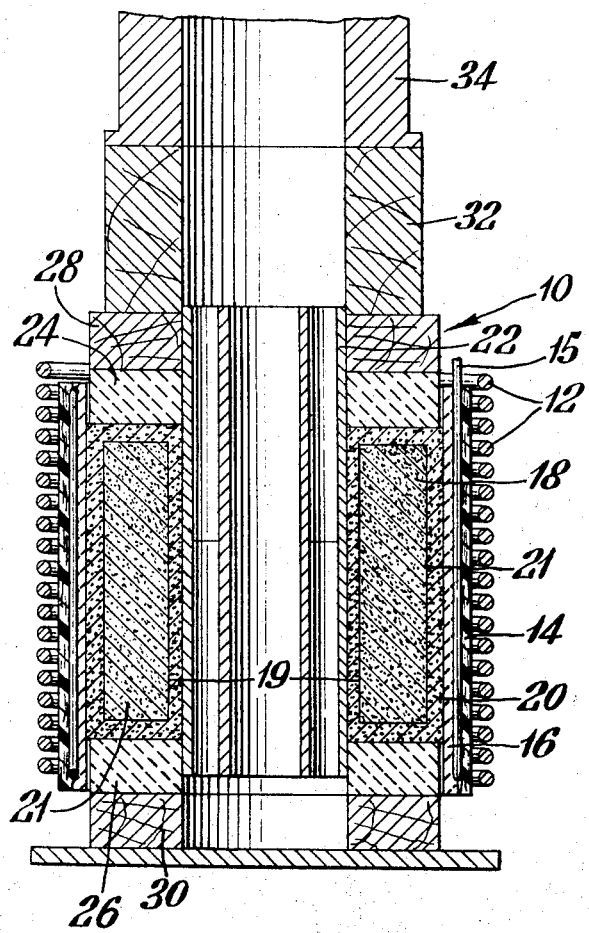

This invention relates to a method of heating a carbonaceous body and more particularly, to a method of heating a large annular carbonaceous body with induction heating means.

A process which is currently employed for making carbon articles is the subject of U.S. Patent 3,092,437. This process uses as the starting material an electrically conductive mixture of comminuted carbonaceous materials such as carbon and graphite particles, and sulfur. After intimate blending of the raw materials, the mix is enclosed in a mold and a pressure, sufficient to compress and decrease the volume of mix by approximately 20 percent, is applied thereto. Generally, a pressure of at least 500 pounds per square inch is required with a relatively coarse particle blend, and for finer materials, pressures as high as 1200 pounds per square inch or higher are required. The compressed blend is then uniformly heated while subjected to pressure as in the compacting process to a maximum temperature of 400° C. and usually to about 350° C. or until the binder material, such as pitch, has become thermoset, but not to a temperature at which the binder is carbonized. The initial temperature rise should be high enough to allow the sulfur in the mix to become dissolved in the pitch throughout the mold charge and later must be increased to a level at which the sulfur and pitch react to provide a thermoset bond in the carbonaceous body. Uniform heating of the compacted blend is best accomplished electrically and the preferred method is by the passage of an electric current therethrough.

The above-described process has been successful in the fabrication of carbonaceuos articles having a diameter of up to 40 inches. Larger carbonaceous bodies having structural integrity are often difficult to produce. Particular difficulty is normally encountered during the curing or forming phases since uniform heating of a large body is generally impractical. Of course, if a large carbonaceous body is essentially a thin-walled hollow tube, induction heating is usually quite suitable. However, many applications require that the body have a substantial wall thickness, notwithstanding a hollow center portion. Induction heating of this type of carbonaceous body causes severe temperature gradients throughout the body. When temperature gradient limitations are specified, the common induction heating technique is to utilize an on-off sequence of the power source which results in a "heat-and-soak" sequence in the product being heated. However, the "heat-and-soak" method requires a lengthly process period and is uneconomical.

It is the principle object of this invention, therefore, to provide a practical, economical method of inductively heating a large annular carbonaceous body.

It is another object of this invention to provide a method of inductively heating a large annular carbonaceous body whereby the temperature gradients throughout the body are greatly reduced.

It is still another object of this invention to provide a method of producing large annular carbonaceous bodies wherein the duration of the forming or curing step is substantially shortened.

Figure 2:
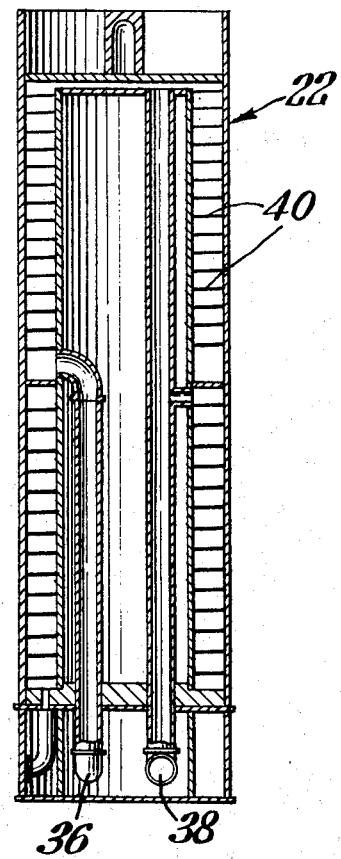

Other objects and advantages of this invention will become apparent from the following description taken in conjunction with the accompanying drawing, wherein:

FIGURE 1 is a cross sectional view of a typical apparatus employed in the method of the invention; and
FIGURE 2 is a vertical section of a mandrel which is employed in the method of the invention.

Broadly, the method of the invention comprises placing a suitable mandrel within the hollow portion of the annular body which is to be heated whereby heat generated within the mandrel due to its presence in an inductive field increases the temperature of the inner surface of the carbonaceous body. Since the outer surface of the carbonaceous body is also being heated by the inductive field, the portion of the carbonaceous body which is between the two surfaces is heated by the combined action of the transfer of heat from the two surfaces and the internal generation of heat by the inductive field. The mandrel which is employed in the method of the invention must have a lower specific resistivity than that of the carbonaceous charge which is undergoing treatment. The shape and structure of the mandrel are dependent upon a number of factors which will hereinafter be further discussed.

Referring now to FIGURE 1, a typical apparatus 10 which may be employed in the method of the invention comprises induction heating means 12 which enclose a fiber glass mold shell 14 which in turn encloses a castable refractory mold liner 16. The fiber glass mold shell 14 has an epoxy resin bond contained therein and a cooling means 15 is interposed between the mold shell 14 and mold liner 16 to prevent the temperature of the mold shell to exceed that value at which the epoxy resin bond softens. A carbonaceous charge or body 18, having been precompacted and surrounded by a coke packing 20, is situated within the area defined by the refractory liner 16. A mandrel 22 is positioned in the hollow center portion of the apparatus 10. Pressure is applied through suitable rams and extensions such as asbestos board extensions 24, 26, wood extensions 28, 30, 32 and a steel ram 34. Wood, asbestos or other materials which are not thermally affected by the inductive field should be used for the extensions.

In operation, heat is generated within the carbonaceous charge 18 by induction coils 12. The presence of the mandrel 22 in the inductive field which is created by the induction coils causes the mandrel to become hot. Transfer of the heat from the mandrel 22 to the carbonaceous body 18 at the inner surface 19 combined with the transfer of heat from the periphery 21 of the body causes the carbonaceous body to be heated such that a minimization of temperature gradient throughout the body is effected. Pressure of between about 500–1200 p.s.i. is simultaneously applied to the body 18 through the various extensions (illustrated by the numerals 24 to 34) during the curing of the precompacted body. The mold shell cooling means may be any suitable means and forms no part of this invention. A typical cooling device is illustrated and fully described in co-pending application entitled "An Apparatus for Forming Large Carbonaceous Bodies" filed concurrently herewith.

FIGURE 2 illustrates a mandrel which is suitably employed in the method of the invention. The mandrel 22 includes an oil inlet 36 and an oil outlet 38. A succession of segmented baffle plates 40 forming a fluid conducting helix are attached to the inside wall of the mandrel. Cooling is therefore provided within the mandrel by introducing oil or a similar coolant into the oil intake 36 and forcing the oil through the mandrel. Cooling of the mandrel occurs after the heating of the carbonaceous body 18 is complete, thereby further reducing the processing time.

The design of the mandrel is particularly important to the successful operation of the method of the invention. The particular structure employed is dependent on a number of factors such as the frequency of the power source, diameter of the induction coil, the inner and outer diameters and the thermal conductivity of the annular body which is being treated, the specific electrical resistivities of the mandrel material and the carbonaceous body, and the magnetic permeability of the mandrel material. Furthermore, the geometric configuration and the physical properties of the carbonaceous charge require a specific mandrel configuration having specific physical properties. An example of a suitably structured mandrel is given as follows:

Example

A stainless steel mandrel having an outside diameter of 26″ and an inside diameter of 24½″ and 88″ in length was employed in the method of the invention using an apparatus similar to that of FIGURE 1. The induction coil diameter was 77½″ and the frequency of the power source was 180 c.p.s. The outside diameter of the carbonaceous charge was 58″ and the inside diameter 28″. With the particular dimensions employed, it was found that a stainless steel type AISI–310 mandrel with a specific resistance value of 78 microhm-cm. and a magnetic permeability of from 1.4–1.6 was required to provide a proper heating rate at the inner surface of the carbonaceous charge. The carbonaceous charge which had an electrical resistivity of 30,000 microhm-cm. material was composed of the following ingredients:

| Ingredients: | Percent |
| --- | --- |
| Sized graphite particles | 39.1 |
| Sized graphite flour | 31.9 |
| Thermatomic black | 5.1 |
| Coal tar pitch | 19.9 |
| Elemental sulfur | 4.0 |
| Total | 100.0 |

The curing was completed in 1040 minutes of which 600 minutes were used in the heat-up cycle, the porous coke envelope and the charge being heated to approximately 340° C. under minimum pressurel oad of 800 pounds per square inch. The curing time of 1040 minutes was approximately 3 times faster than the time required without the use of a mandrel.

Temperature measurements were taken at various points in the carbonaceous charge. Several measurements were made at the junction between the mandrel and the carbonaceous charge (inner surface) and further measurements were made at points on the periphery (outer surface) of the charge. The following table summarizes the data.

| Time (minutes) | Temperature, ° C., mandrel junction | Temperature, ° C., charge periphery |
| --- | --- | --- |
| 100 | 150 | 75 |
| 200 | 185 | 140 |
| 300 | 225 | 200 |
| 400 | 265 | 240 |
| 500 | 300 | 270 |
| 600 | 340 | 335 |
| Heating Stopped-Cooling Oil Supplied to Mandred | | |
| 700 | 265 | 300 |
| 800 | 210 | 265 |
| 900 | 115 | 235 |
| 1,000 | 115 | 180 |

The data in the above table clearly illustrates that the temperature rate of increase at the mandrel junction is substantially similar to that of the periphery of the charge. A curing temperature of 340° is obtained at almost the same point in time in each area. Thus, it is shown that the charge is similarly heated at its outer surface as well as at its inner surface. Furthermore, temperature measurements (not shown in the table) indicate that the charge temperature at the midpoint between the mandrel and periphery junctions, differs no more than approximately 20–30° C. from the temperature at either the outer or inner surfaces. Data further indicate that in a similar apparatus without a heat generating mandrel this temperature differential is more than doubled. The table also indicates that the passage of oil or other coolant through the mandrel after the heat-up cycle enables the carbonaceous body to be removed from the mold in a relatively short time, thus adding to the efficiency of the entire process.

It will be appreciated that, if warranted, as much as 1000° C. may be employed in the method of the invention by selecting an appropriate material for the mandrel. Temperatures as high as 2500° C. may also be achieved if a material such as graphite is used. The preferred mandrel material is stainless steel, but other electrically conductive materials such as copper or aluminum are quite suitable. If stainless steel is employed, magnetic permeability generally results in an increase in surface temperature. A magnetic permeability of from about 1 to about 500 is preferred.

The thickness of the mandrel is a further design consideration. The mandrel obviously should be as thin as possible while still maintaining structural integrity since the heat generated at its surface should be intense enough to effectively penetrate the charge or body from the inner surface thereof and the thinner the mandrel the greater will be the heat concentration at its surface.

The surface temperature is also directly proportional to the frequency of the source. However, the lower the frequency is, the better is the internal hett generation within the body due to the inductive field. Therefore, a frequency range of from about 60 c.p.s. to about 3000 c.p.s. is preferred since excellent heating of the body occurs at these frequencies.

From the above, it will be appreciated that in accordance with the method of the invention, large annular carbonaceous bodies having diameters up to 100 inches or more are quickly and efficiently fabricated.

What is claimed is:
1. A method for forming a large, thick walled, annular carbonaceous body, employing induction heating means comprising
 (a) placing a carbonaceous charge in a mold;
 (b) placing an electrically conductive mandrel having a lower specific resistivity than that of said carbonaceous charge peripherally contiguous with the inner surface of said charge, said mandrel having generally thin walls and being substantially entirely electrically conductive;

(c) applying a pressure of between about 500 pounds per square inch and about 1200 pounds per square inch to said charge; and during the application of the pressure (d) activating the induction heating means thereby generating internal heat in said carbonaceous charge and thereby generating heat at the surface of said mandrel, heat from said mandrel being transferred to the carbonaceous material at each point of contact therewith whereby a minimization of temperature gradient in said charge during said heating is effected, and (e) passing a coolant through the interior of said mandrel at the termination of said heating.

2. The method of claim 1 wherein the step of providing the mandrel with a plurality of bafflle plates along the interior wall surfaces is added to facilitate the passing of said coolant.

3. The method of claim 2 wherein the step of positioning said baffle plates in a helical configuration is provided.

References Cited

UNITED STATES PATENTS 3,179,723    4/1965    Goeddel    264—29 X
3,248,215    4/1966    Bonis et al.    264—27

FOREIGN PATENTS 244,063    3/1963    Australia.

ROBERT A. O'LEARY, *Primary Examiner.*

MEYER PERLIN, *Examiner.*

A. W. DAVIS, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,405,205                                                  October 8, 1968

Gayle L. Rowe et al.

It is certified that error appears in the above identified patent and that said Letters Patent are hereby corrected as shown below:

Column 6, after line 5, insert the following:

| | | | |
|---|---|---|---|
| 1,862,120 | 6/1932 | Northrup | 219-10.49 |
| 2,556,236 | 6/1951 | Strickland, Jr. | 219-10.41X |
| 2,586,328 | 2/1952 | Hagopian | 219-10.57 |
| 2,875,311 | 2/1959 | Harkenrider | 219-10.49 |
| 2,912,549 | 11/1959 | Dunn | 219-10.41X |
| 2,948,797 | 8/1960 | Kurtz et al. | 219-10.49X |
| 3,079,630 | 3/1963 | Orr | 219-10.49X |

Signed and sealed this 24th day of February 1970.

(SEAL)
Attest:

Edward M. Fletcher, Jr.                        WILLIAM E. SCHUYLER, JR.
Attesting Officer                                      Commissioner of Patents